United States Patent
Ichikawa et al.

(10) Patent No.: US 10,622,609 B2
(45) Date of Patent: Apr. 14, 2020

(54) DUCT HOLDING STRUCTURE FOR BATTERY ASSEMBLY BODY

(71) Applicants: Yazaki Corporation, Tokyo (JP); TOYOTA JIDOSHA KABUSHIKI KAISHA, Toyota-shi, Aichi-ken (JP)

(72) Inventors: Yoshiaki Ichikawa, Kakegawa (JP); Koji Koizumi, Kakegawa (JP); Takenori Tsuchiya, Toyota (JP)

(73) Assignees: YAZAKI CORPORATION, Minato-ku, Tokyo (JP); TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 94 days.

(21) Appl. No.: 14/763,900

(22) PCT Filed: Mar. 17, 2014

(86) PCT No.: PCT/JP2014/057200
§ 371 (c)(1),
(2) Date: Jul. 28, 2015

(87) PCT Pub. No.: WO2014/156787
PCT Pub. Date: Oct. 2, 2014

(65) Prior Publication Data
US 2015/0372268 A1  Dec. 24, 2015

(30) Foreign Application Priority Data
Mar. 25, 2013  (JP) .................................. 2013-062814

(51) Int. Cl.
*H01M 2/12* (2006.01)
*H01M 2/10* (2006.01)
*H01M 2/20* (2006.01)

(52) U.S. Cl.
CPC ....... *H01M 2/1264* (2013.01); *H01M 2/1061* (2013.01); *H01M 2/1077* (2013.01);
(Continued)

(58) Field of Classification Search
CPC ............. H01M 2/1061; H01M 2/1077; H01M 2220/20; H01M 2/202; H01M 2/1264; H01M 2/1252
(Continued)

(56) References Cited

U.S. PATENT DOCUMENTS 6,743,546 B1 * 6/2004 Kaneda ................. H01M 2/021
429/127
8,597,808 B2 12/2013 Park et al.
(Continued)

FOREIGN PATENT DOCUMENTS

CN    102468463 A    5/2012
JP    2003100273 A   4/2003
(Continued)

OTHER PUBLICATIONS

English language machine translation of "Power supply device, and vehicle and power storage device" in Fujii Kazuhiro JP2013171746 (A)—Sep. 2, 2013 (Year: 2013).*
(Continued)

*Primary Examiner* — Jonathan G Jelsma
*Assistant Examiner* — Omar M Kekia
(74) *Attorney, Agent, or Firm* — Sughrue Mion, PLLC

(57) ABSTRACT

A duct holding structure includes insulating resin busbar modules (11a, 11b) which are attached to a battery assembly body (2) in which plural batteries (1) are arranged and connected to each other in series, and hold busbars (9) each of which connects electrodes of adjoining ones of the batteries (1); and an insulating resin duct (3) which is attached to the battery assembly body (2) while covering gas
(Continued)

vents that are formed through an electrode surface (6) from which the electrodes of the batteries (1) project. The duct (3) and the busbar modules (11*a*, 11*b*) are provided with lock mechanisms (23) which lock the busbar modules (11*a*, 11*b*) on the duct (3).

4 Claims, 3 Drawing Sheets

(52) U.S. Cl.
CPC ......... *H01M 2/1252* (2013.01); *H01M 2/202* (2013.01); *H01M 2220/20* (2013.01)

(58) Field of Classification Search
USPC .......................................................... 429/87
See application file for complete search history.

(56) References Cited

U.S. PATENT DOCUMENTS

| | | | | |
|---|---|---|---|---|
| 2011/0229754 | A1* | 9/2011 | Zhao | H01M 10/0413 |
| | | | | 429/158 |
| 2012/0114993 | A1 | 5/2012 | Park et al. | |
| 2012/0328918 | A1* | 12/2012 | Kim | H01M 2/1217 |
| | | | | 429/87 |

FOREIGN PATENT DOCUMENTS

| | | | | |
|---|---|---|---|---|
| JP | 2004227928 A | | 8/2004 | |
| JP | 2010205509 A | | 9/2010 | |
| JP | 2011253735 A | | 12/2011 | |
| JP | 201299432 A | | 5/2012 | |
| JP | 2012104471 A | | 5/2012 | |
| JP | 2012113896 A | | 6/2012 | |
| JP | 2012230775 A | | 11/2012 | |
| JP | 2013171746 | * | 9/2013 | .......... H01M 2/1061 |
| JP | 2015207340 A | | 11/2015 | |

OTHER PUBLICATIONS

Search Report dated May 13, 2014, issued by the International Searching Authority in counterpart International Application No. PCT/JP2014/057200 (PCT/ISA/210).

Written Opinion dated May 13, 2014 issued by the International Searching Authority in International Application No. PCT/JP2014/057200 (PCT/ISA/237).

Office Action dated Feb. 13, 2017, by the Japanese Patent Office in counterpart Japanese Application No. 2013-062814.

Communication dated Sep. 30, 2016, issued by the State Intellectual Property Office of P.R. China in counterpart Chinese Application No. 201480018480.2.

* cited by examiner

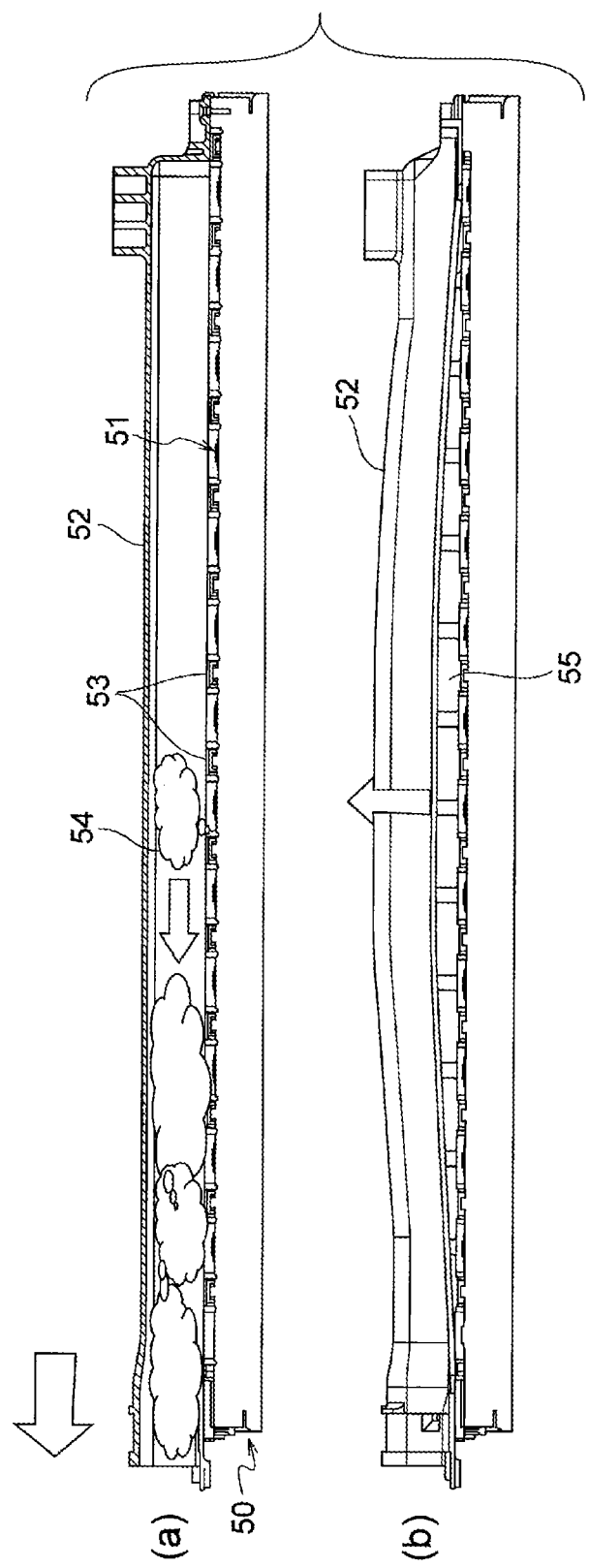

DUCT HOLDING STRUCTURE FOR BATTERY ASSEMBLY BODY

TECHNICAL FIELD

The present invention relates to a duct holding structure for a battery assembly body.

BACKGROUND ART

The following Patent document 1 discloses a battery assembly body that is configured in such a manner that plural batteries each having a rectangular parallelepiped shape and the positive pole and the negative pole of each adjoining pair of batteries are connected to each other in series by a busbar. Each of the batteries constituting the battery assembly body is formed with a gas vent (hereinafter referred to as a vent where appropriate) for venting gas that is generated inside the battery. For example, this vent is formed by forming an opening through a side wall of the battery and closing it by a thin metal film or the like. With this structure, gas that is generated inside the battery is discharged through the vent breaking the metal film when the pressure inside the battery has become higher than or equal to a prescribed value.

In this type of battery, usually, an electrode surface on which at least one of the positive pole and the negative pole is disposed is formed with a gas vent. For example, an electrode surface on which both of the positive pole and the negative pole are disposed is formed with a gas vent approximately at the middle between the two electrodes. A battery assembly body that is formed by arranging such batteries is provided with an insulating resin duct for guiding and ejecting gas that is discharged through each vent. This duct extends in the battery arrangement direction so as to cover the vents (also called pressure release valves) and is formed with a flow passage for gas that is discharged through each pressure release valve between itself and the electrode surfaces of the battery assembly body.

Incidentally, since gas that is discharged through the gas vent of each battery has a relatively high temperature, the duct may be deformed because of exposure to such high-temperature gas. FIG. 3(*a*) is a sectional view of a duct 52 that is attached to the electrode surface 51 of a battery assembly body 50. In FIG. 3(*a*), as for the battery assembly body 50, only the electrode surface 51 and their neighborhood are shown and the other portions are omitted. As seen from FIG. 3(*a*), gas 54 that is discharged through a gas vent 53 flows through the duct 52 in the direction indicated by an arrow and is ejected outward. On the other hand, as shown in FIG. 3(*b*), when the duct 52 is heated by the gas 54, its central portion in the longitudinal direction is deformed and warped upward (indicated by an arrow; in the direction that goes away from the electrode surface 51). In this case, gaps 55 may be formed between the duct 52 and the electrode surface 51 to cause leakage of part of the gas 54 through the gaps 55.

In this connection, Patent document 1 has a disclosure that plural batteries (battery assembly body) are housed and fixed in a case and the duct is covered with an insulating resin cover member from above and the cover member is held by the case with the duct pressed against the electrode surfaces. With this structure, the duct can be held between the cover member and the electrode surfaces of the battery assembly body and hence the deformation of the duct can be suppressed.

PRIOR ART DOCUMENTS

Patent Documents

Patent document 1: JP-A-2012-113896

SUMMARY OF THE INVENTION

Problems to Be Solved by the Invention

Incidentally, in the above Patent document 1, the structure for letting the cover member held by the case is such that nails projecting from two respective end portions of the cover member are fitted into and locked on housing portions that are formed in an outer periphery of the case. However, in this structure, the cover member is formed over the width of the electrode surfaces of the battery assembly body, resulting in problems that components that are attached to the battery assembly body are increased in size and complexity and the ease of attachment of the cover member to the case is lowered. Furthermore, as the cover member becomes larger, it may become so prone to deformation as to be unable to prevent deformation of the duct.

An object of the present invention is to provide a duct holding structure for a battery assembly body that can simplify the structure for holding a duct and to prevent deformation of the duct.

Means for Solving the Problems

The above object of the invention can be attached by the following structures:

(1) A duct holding structure for a battery assembly body including: a rectangular-parallelepiped-shaped battery assembly body in which plural batteries are arranged and connected to each other in series; an insulating resin busbar module that is attached to the battery assembly body and holds busbars each of which connects electrodes of adjoining ones of the batteries; gas vents that are respectively formed on surfaces of the batteries from which the electrodes project; and an insulating resin duct that extends in an arrangement direction of the batteries while covering the gas vents, and is attached to the battery assembly body, wherein the insulating resin duct and the busbar module are provided with a lock mechanism which locks the duct to the busbar module.

According to the duct holding structure for a battery assembly body of item (1), since one of the duct and the busbar module which is attached to the battery assembly body is locked on the other of the duct and the busbar module, it is not necessary to use any new member for holding the duct. Therefore, the battery holding structure is made simpler. Furthermore, since the duct and the busbar module are provided with respective portions of the lock mechanism, direct locking can be attained between the duct and the busbar module. As a result, the force of holding the duct is made stronger and hence deformation of the duct can be prevented (2) The duct holding structure for a battery assembly body according to the configuration of item (1), wherein the lock mechanism includes a lock portion and a lock counterpart portion, the lock portion projects from one of side surfaces of the duct and the busbar module which face to each other and the lock counterpart portion projects from the other of the side surfaces; and wherein a locking of the lock mechanism is attained by inserting the lock portion into an insertion hole of the lock counterpart portion.

In the duct holding structure for a battery assembly body of item (2), the lock mechanism is provided between the duct and the busbar module. Therefore, the space utilization efficiency is made higher, whereby size increase of the battery assembly body is prevented and the ease of attachment of the duct can be increased.

(3) The duct holding structure for a battery assembly body according to the configuration of item (2), wherein plural lock mechanisms are arranged in the arrangement direction of the batteries.

The duct holding structure for a battery assembly body of item (3) can prevent deformation of the duct more reliably.

BRIEF DESCRIPTION OF THE DRAWINGS

FIGS. 3(a) and 3(b) are a sectional view and a side view, respectively, illustrating how a duct is deformed in a conventional duct holding structure.

MODES FOR CARRYING OUT THE INVENTION

A duct holding structure for a battery assembly body according to an embodiment of the present invention will be hereinafter described with reference to the accompanying drawings. Battery assemblies according to the invention are typically ones applied to power devices that are installed in, for example, electric vehicles that run on the drive power of an electric motor and hybrid vehicles that run on the drive power of an engine and an electric motor and supply power to the electric motor. It goes without saying that battery assemblies according to the invention are not limited to those and can also be applied to power devices etc. of other kinds of movable bodies.

Figure 1:
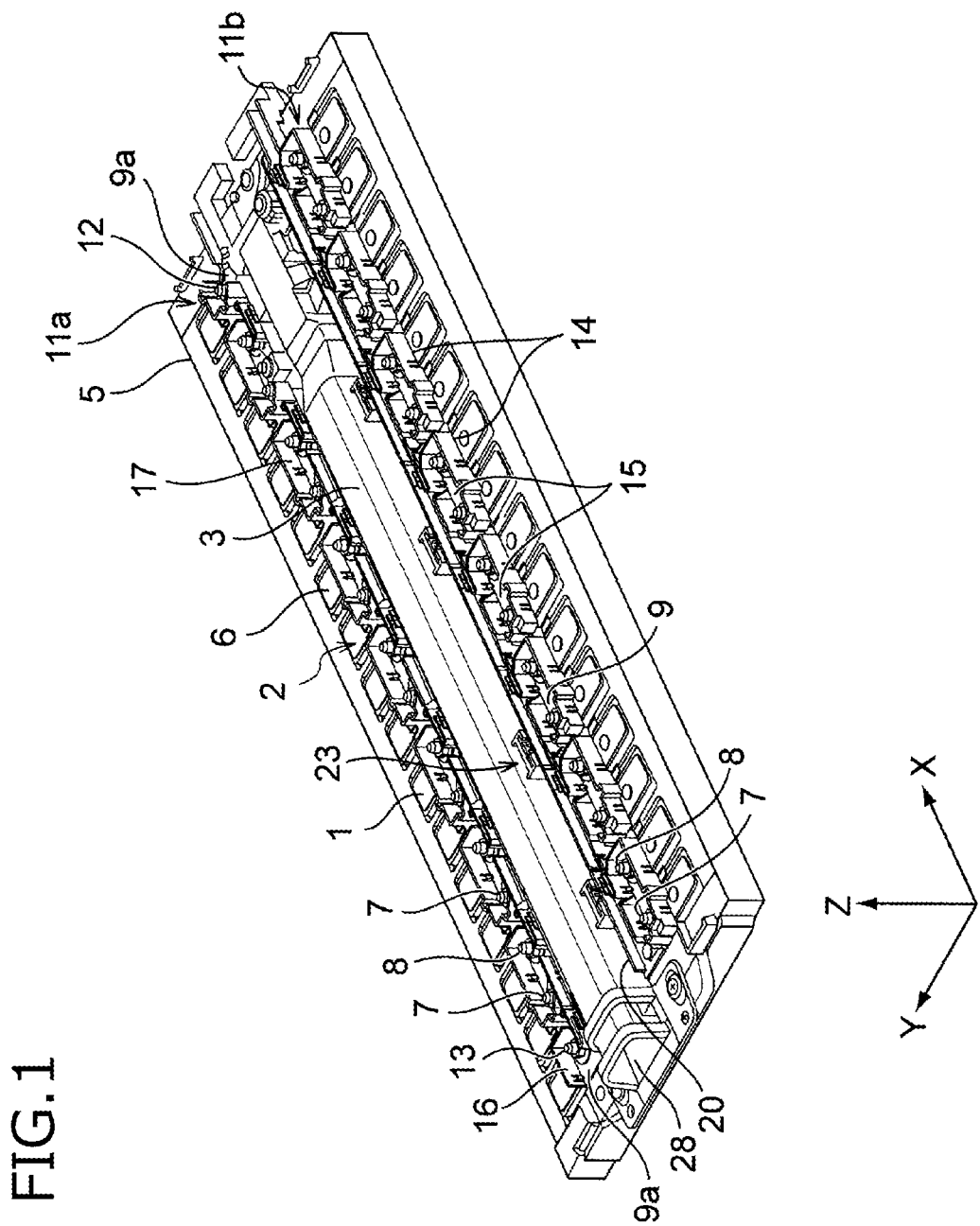
FIG. 1 is a perspective view of a duct holding structure for a battery assembly body according to an embodiment of the present invention.
Figure 2:
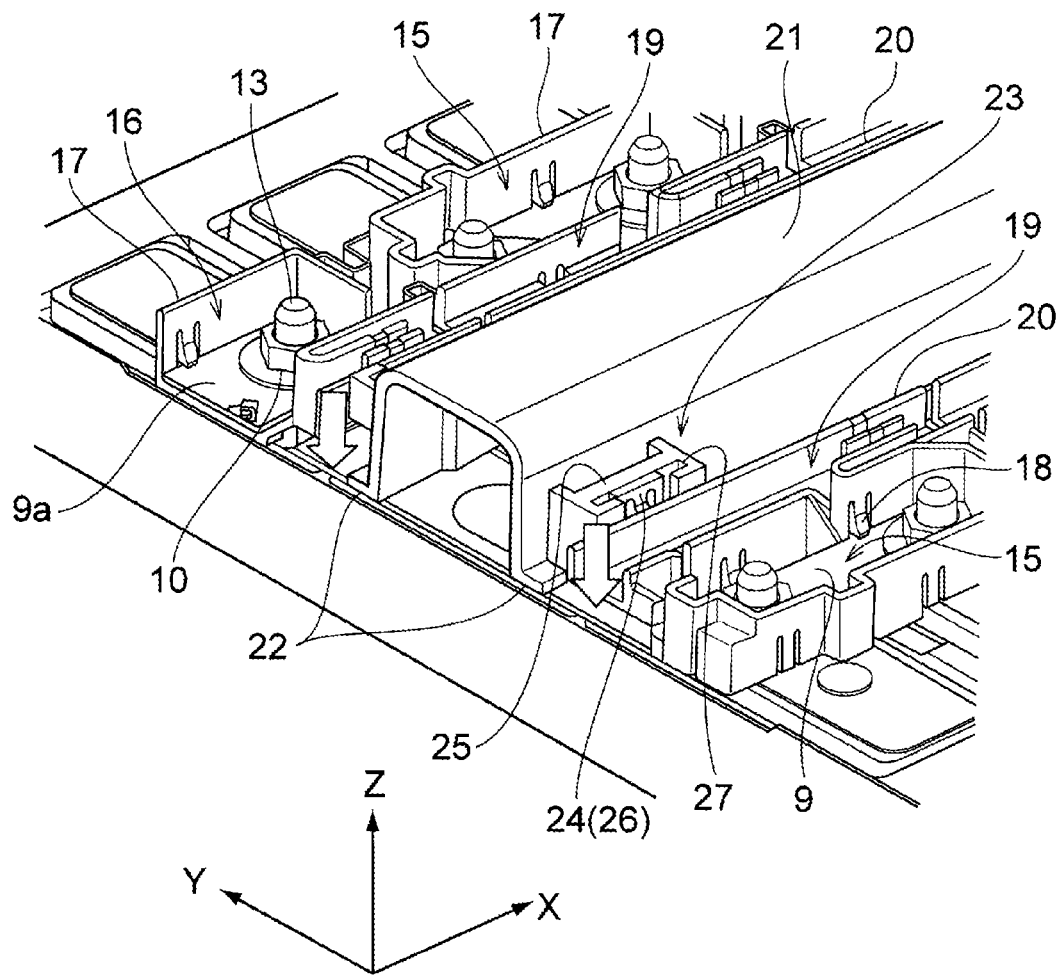
FIG. 2 is an enlarged perspective view of lock mechanisms shown in FIG. 1.

FIG. 1 is a perspective view showing a configuration in which a duct 3 is held by a battery assembly body 2 which consists of plural batteries 1. In FIG. 1, as for the battery assembly body 2, its surface to which the duct 3 is attached and its vicinity are shown. FIG. 2 is an enlarged perspective view of part of FIG. 1, that is, holding structures for the duct 3. In FIGS. 1 and 2, the X direction, Y direction, and Z direction are defined as the arrangement direction of the batteries 1, the width direction of the batteries 1 which is perpendicular to the X direction, and the direction in which electrodes project from the individual batteries 1, respectively.

The battery assembly body 2 is configured in such a manner that the plural batteries 1 each having a rectangular parallelepiped shape are arranged and housed in an insulating case 5. The battery assembly body 2 assumes a rectangular parallelepiped shape as a whole. In each battery 1, a positive pole post 7 (positive electrode post) and a negative pole post 8 (negative electrode post) project upward (in the Z direction) from one electrode surface 6. As shown in FIG. 1, the electrode surface 6 of each battery 1 is part of a top surface (hereinafter referred to as a cell top surface) of the battery assembly body 2. In the battery assembly body 2, the positive pole posts 7 and the negative pole posts 8 of the plural batteries 1 are arranged alternately and the positive pole post 7 and the negative pole post 8 of each adjoining pair of batteries 1 are connected to each other in series by a busbar 9. The positive pole post 7 and the negative pole post 8 of each battery 1 are threaded for threaded engagement with respective nuts 10. The battery assembly body is not restricted to the battery assembly body 2 employed in the embodiment in which the batteries 1 are housed in the case 5; for example, the battery assembly body may be configured in such a manner that plural batteries 1 that are laid on each other are bound (integrated) by a known fixing member.

A gas vent (not shown; also called a pressure release valve; the same as each gas vent 53 shown in FIG. 3) is formed through the electrode surface 6 of each battery 1 at the middle between the positive pole post 7 and the negative pole post 8. For example, this gas vent is formed by forming an opening through the electrode surface 6 of the battery 1 and closing it by a thin metal film or the like. With this structure, gas that is generated inside the battery 1 is discharged through the gas vent breaking the metal film when the pressure inside the battery 1 has become higher than or equal to a prescribed value.

Two busbar modules 11a and 11b are attached to the cell top surface of the battery assembly body 2 in such a manner their longitudinal directions are in the arrangement direction of the batteries 1. The busbar modules 11a and 11b are planar as a whole and are disposed on the two respective sides of the duct 3 (i.e., the duct 3 is interposed between the busbar modules 11a and 11b). The busbar modules 11a and 11b are configured in such a manner that at least the plural busbars 9 and busbars 9a connected to a prime positive pole post 12 (prime positive electrode post) and a prime negative pole post 13 (prime negative electrode post) of the battery assembly body 2, respectively, are held by resin plates 14.

Each busbar 9 is a plate member made of a conductive metal and has a pair of through-holes (not shown) through which the positive pole post 7 and the negative pole post 8 of an adjoining pair of batteries 1 are inserted. Each busbar 9a is a plate member made of a conductive metal and has a through-hole (not shown) through which the prime positive pole post 12 or the prime negative pole post 13 are inserted.

As shown in FIG. 1, the resin plates 14 have plural first housing portions 15 in which house the respective busbars 9 and second housing portions 16 which house the respective busbars 9a. The housing portions are arranged so as to conform to the arrangement of the electrode posts of the battery assembly body 2, and adjoining housing portions are linked to each other by a hinge (not shown). Each housing portion 15 or 16 is formed being defined by an approximately rectangular circumferential wall 17 which is erected, in frame form, from the bottom wall of the associated resin plate 14. Each portion of the bottom wall surrounded by the associated circumferential wall 17 has an electrode insertion hole or holes through which the electrode post or posts are inserted. Nails 18 projecting from the circumferential wall of each first housing portion 15 or second housing portion 16 are locked on the busbar 9 or 9a housed therein, whereby the busbar 9 or 9a is held in the housing portion 15 or 16. The positive pole post 7 and the negative pole post 8 that are inserted through the respective electrode insertion holes are inserted through the respective insertion holes of the busbar 9 that is held by each first housing portion 15, and the portions, projecting from the respective insertion holes, of the positive pole post 7 and the negative pole post 8 are screwed into the respective nuts 10. As a result, the positive pole post 7 and the negative pole post 8 which are a pair of electrode posts are electrically connected to each other by the busbar 9. On the other hand, the prime positive pole post 12 or the prime negative pole post 13 that is inserted through the electrode insertion hole is inserted through the insertion hole of the busbar 9a that is held by each second housing portion 16, and the portion, projecting from the insertion hole, of the prime positive pole post 12 or the prime negative pole post 13 is screwed into the nut 10. Since the electrode posts are screwed into the respective nuts 10 in this manner, the busbar modules 11a and 11b are attached to the cell top surface of the battery assembly body 2 and held by it.

Each resin plate 14 is formed with a wiring passage 19 through which a number of wires (not shown) are wired. The wiring passage 19 extends straightly parallel with the arrangement direction (X direction) of the first housing portions 15 (and the second housing portions 16), and is formed between portions of the first housing portions 15 (and the second housing portions 16) and an erected, plate-like wall 20 with a portion of the bottom wall interposed in between. As shown in FIG. 1, the walls 20 of the wiring passages 19 of the two busbar modules 11a and 11b are opposed to the duct 3. For example, the wires that are wired through each wiring passage 19 are voltage detection lines that are connected to the respective busbars 9 to detect voltages of the respective batteries 1.

The duct 3 is made of an electrically insulative resin material. The duct 3 has a main body 21 that is approximately U-shaped or groove-shaped in cross section and flat-plate-like flanges 22 that is continuous with the two respective ends of the main body 21, and is disposed so as to extend from one end, in the longitudinal direction, of the battery assembly body 2 to the other end of it. The flanges 22 are in contact with the cell top surface of the battery assembly body 2 over the entire length in its longitudinal direction. The duct 3 is disposed in such a manner that the main body 21 is opposed to, that is, covers, all of the gas vents. Thus, a prism-shaped space through which gas discharged from the gas vents is to flow is formed between the main body 21 and the cell top surface.

Next, a characterizing structure of the invention will be described. As shown in FIG. 2, lock mechanisms 23 for causing the busbar modules 11a and 11b to be locked on the duct 3 are provided between them. Each lock mechanism 23 is composed of a lock portion 24 of the busbar module 11a or 11b and a lock counterpart portion 25 of the duct 3.

The lock portion 24 is a single-support plate-like member that projects from the wall 20 (opposed to the duct 3) of the wiring passage 19 of the associated busbar module 11a or 11b. The lock portion 24 has a base portion (not shown) that projects approximately perpendicularly from the wall 20 and an insertion portion 26 that extends from the tip of the base portion upward (in the Z direction), and is thus L-shaped as a whole. The insertion portion 26 is formed with an opening (not shown) at a position that is distant from its tip surface (top end surface) by a prescribed distance so as to penetrate through the insertion portion 26 in its thickness direction (Y direction).

The lock counterpart portion 25 projects a side surface, opposed to the wall 20, of the main body 21 of the duct 3 and is formed with an insertion hole 27 that penetrates through the lock counterpart portion 25 in its height direction (Z direction). The insertion hole 27 is formed so as to be approximately rectangular in a sectional view taken perpendicularly to the height direction so that the lock portion 24 (insertion portion 26) can be inserted into it. A lock projection projects into the insertion hole 27 so as to be engaged with the opening of the insertion portion 26 and thereby locked on the insertion portion 26 when the duct 3 (more specifically, flanges 22) has been brought into contact with the cell surface of the battery assembly body 2.

The plural lock mechanisms 23 each having the above structure are disposed between the duct 3 and the busbar modules 11a and 11b so as to be arranged in the longitudinal direction of the duct 3 at prescribed intervals.

To attach the duct 3 to the battery assembly body 2, the flanges 22 of the duct 3 are brought close to the cell surface of the battery assembly body 2 and the lock portions 24 (more specifically, insertion portions 26) of the busbar modules 11a and 11b are inserted into the insertion holes 27 of the corresponding lock counterpart portions 25 of the duct 3. Then downward force is exerted on the duct 3, whereby the insertion portions 26 that have been inserted in the insertion holes 27 of the lock counterpart portions 25 are pressed against the lock projections in the insertion holes 27 and deformed elastically toward the walls 20. The downward force continues to be exerted on the duct 3, whereby the flanges 22 of the duct 3 are pressed against the cell top surface of the battery assembly body 2 and the lock projections are engaged with the openings of the insertion portions 26, whereupon the insertion portions 26 recover from the elastically deformed state. Because of the recovery of the insertion portions 26, the lock portions 24 are locked on the respective lock counterpart portions 25 and the movement of the former in their height direction (Z direction) is restricted. As a result, the duct 3 is held by the busbar modules 11a and 11b with both its flanges 22 in contact (e.g., in close contact) with the cell top surface of the battery assembly body 2. That is, the duct 3 is held by the cell top surface of the battery assembly body 2 via the busbar modules 11a and 11b. The method for attaching the flanges 22 is not limited to the method of the embodiment in which the flanges 22 are attached to the busbar modules 11a and 11b that are already attached to the battery assembly body 2. Another method is possible in which the flanges 22 are attached in advance to the busbar modules 11a and 11b that have not been attached to the battery assembly body 2 yet and then they are attached together to the battery assembly body 2.

When gas is discharged from a gas vent in a state that the duct 3 is attached to the battery assembly body 2, the discharged gas flows through the space that is formed between the main body 21 of the duct 3 and the cell top surface of the battery assembly body 2 and is ejected from an outlet 28 (see FIG. 1). At this time, the duct 3 is heated by the heat generated by the gas that flows through the space of the duct 3. In this connection, in the embodiment, because of the presence of the lock mechanisms 23, the duct 3 is held by the busbar modules 11a and 11b while being kept in contact with the cell top surface of the battery assembly body 2. Therefore, unlike in the case shown in FIG. 3, the duct 3 can be prevented from being deformed and lifted up from the cell top surface. Thus, no gap is formed between the cell top surface and the flanges 22 of the duct 3 and gas leakage through such a gap can be prevented.

In the embodiment, the duct 3 is held by integrating the duct 3 with the busbar modules 11a and 11b by means of the lock mechanisms 23. It is not necessary to use any new member (e.g., the cover member used in Patent document 1) for holding the duct 3. Therefore, the battery assembly body 2 is made simpler in structure and hence can be miniaturized. Furthermore, in the embodiment, the lock members 23 are attached to the side surfaces, opposed to each other, of the duct 3 and the busbar modules 11a and 11b. For example, this makes it easier to attach the duct 3 to the busbar modules 11a and 11b that have already been attached to the cell top surface of the battery assembly body 2. In addition, since the duct 3 is attached to the busbar modules 11a and 11b directly, that is, without intervention of other members, the force of holding the duct 3 can be made stronger. Therefore, the deformation of the duct due to heat can be suppressed, whereby the duct 3 can be prevented from being lifted up from the cell top surface and gas leakage through a gap between the duct 3 and the cell top surface can be prevented.

Although the embodiment of the invention has been described in detail with reference to the drawings, the embodiment is just an example of the invention and the invention is not limited to only the configuration of the embodiment. It goes without saying that the invention encompasses design changes etc. that do not depart from the spirit and scope of the invention.

For example, although in the embodiment the duct 3 is provided with the lock counterpart portions 25 and the busbar modules 11a and 11b are provided with the lock portions 24, the invention is not limited to such a case. For example, a configuration is possible in which the duct 3 is provided with the lock portions 24 and the busbar modules 11a and 11b are provided with the lock counterpart portions 25. The structures of the lock portion 24 and the lock counterpart portion 25 are not limited to those of the embodiment; they may have other structures as long as they allow the duct 3 to be held as a result of being locked on the busbar modules 11a and 11b.

Although in the embodiment the lock mechanisms 23 are provided between the duct 3 and the two busbar modules 11a and 11b, another configuration is possible in which lock mechanisms are provided between the one busbar module 11a and the duct 3 and fixing structures of another kind are provided between the other busbar module 11b and the duct 3.

The features of the above-described duct holding structure for a battery assembly body according to the embodiment of the invention will be summarized below concisely as items [1]-[3]:

[1] A duct holding structure for a battery assembly body, including: a rectangular-parallelepiped-shaped battery assembly body 2 in which plural batteries 1 are arranged and connected to each other in series; an insulating resin busbar module 11a, 11b that is attached to the battery assembly body 2 and holds busbars 9 each of which connects electrodes of adjoining ones of the batteries 1; gas vents that are respectively formed on surfaces (electrode surfaces) 6 of the batteries 1 from which the electrodes project; and an insulating resin duct 3 that extends in an arrangement direction of the batteries 1 while covering the gas vents, and is attached to the battery assembly body 2, wherein the insulating resin duct 3 and the busbar module 11a, 11b are provided with a lock mechanism 23 which locks the duct 3 on the busbar module 11a, 11b.

[2] The duct holding structure for a battery assembly body which is based on the configuration of item [1], wherein the lock mechanism 23 includes a lock portion 24 and a lock counterpart portion 25, wherein the lock mechanism 23 projects from one of side surfaces of the duct 3 and the busbar module 11a, 11b which face to each other and the lock counterpart portion 25 projects from the other of the surface, and wherein a locking of the lock mechanism is attained by inserting the lock portion 24 into an insertion hole 27 of the lock counterpart portion 25.

[3] The duct holding structure for a battery assembly body which is based on the configuration of item [2], wherein plural lock mechanisms 23 are arranged in the arrangement direction of the batteries 1.

The present application is based on Japanese Patent Application No. 2013-062814 filed on Mar. 25, 2013, the disclosure of which is incorporated herein by reference.

INDUSTRIAL APPLICABILITY

The duct holding structure for a battery assembly body according to the invention makes it possible to attach a duct to a battery assembly body by means of a simple structure and to prevent deformation of the duct.

DESCRIPTION OF SYMBOLS

1: Battery
2: Battery assembly body
3: Duct
6: Electrode surface (surface)
7: Positive pole post
8: Negative pole post
9: Busbar
11a, 11b: Busbar module
17: Circumferential wall
19: Wiring passage
20: Wall
21: Main body
23: Lock mechanism
24: Lock portion
25: Lock counterpart portion
27: Insertion hole

The invention claimed is:

1. A duct holding structure for a battery assembly body, comprising:
   a rectangular-parallelepiped-shaped battery assembly body in which plural batteries are arranged and connected to each other in series;
   an insulating resin busbar module that is attached to the battery assembly body and holds busbars each of which connects electrodes of adjoining ones of the batteries;
   gas vents that are respectively formed on surfaces of the batteries from which the electrodes project; and
   an insulating resin duct that extends in an arrangement direction of the batteries while covering the gas vents, and is attached to the battery assembly body, wherein
   the insulating resin duct has a U-shaped main body including side walls and a top wall connecting the side walls,
   the insulating resin duct is attached to a cell top surface of the battery assemble body, the top wall opposing the cell top surface so that the side walls, the top wall, and the cell top surface define a pathway space communicated with the gas vents,
   a flanged end extends from an end edge of each of the side walls in a direction away from the pathway space and in parallel to the cell top surface, the end edge being disposed at a side of the cell top surface,
   the flanged ends come in direct contact with the cell top surface of the battery assemble body,
   the insulating resin duct and the busbar module are provided with a lock mechanism which locks the duct to the busbar module,
   the lock mechanism comprises a lock portion and a lock counterpart portion,
   the lock counterpart portion comprises an insertion hole formed as a through-hole,
   the lock portion projects from one of the flanged end of the duct and a side surface of the busbar module, and
   the lock counterpart portion projects from the other of the flanged end of the duct and the side surface of the busbar module.

2. The duct holding structure for a battery assembly body according to claim 1, wherein the lock portion projects from one of the side walls of the duct and the busbar module which face each other and the lock counterpart portion projects from the other of the side walls of the duct and the busbar module; and wherein a locking of the lock mechanism is attained by inserting the lock portion into the insertion hole of the lock counterpart portion.

3. The duct holding structure for a battery assembly body according to claim 2, wherein plural lock mechanisms are arranged in the arrangement direction of the batteries.

4. The duct holding structure according to claim 1, wherein cantilevered ends of the lock portion and the lock counterpart portion each project from the one of the flanged end and the other of the flanged end respectively to a same height from the flanged end, wherein the same height is in a direction in which the insulating resin duct is configured to be attached and detached by the locking mechanism and in which the lock portion is configured to be inserted into the through hole.

* * * * *